United States Patent
Greenwell

(10) Patent No.: US 9,352,279 B2
(45) Date of Patent: May 31, 2016

(54) FILTER SUBSTRATE COMPRISING THREE-WAY CATALYST

(71) Applicant: JOHNSON MATTHEY PUBLIC LIMITED COMPANY, London (GB)

(72) Inventor: David Robert Greenwell, Lower Cambourne (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/869,138

(22) Filed: Apr. 24, 2013

(65) Prior Publication Data
US 2014/0044626 A1 Feb. 13, 2014

Related U.S. Application Data

(60) Provisional application No. 61/637,545, filed on Apr. 24, 2012.

(30) Foreign Application Priority Data

Apr. 27, 2012 (GB) .................... 1207313.6

(51) Int. Cl.
*B01D 53/34* (2006.01)
*B01D 53/56* (2006.01)
(Continued)

(52) U.S. Cl.
CPC .......... *B01D 53/9454* (2013.01); *B01D 53/945* (2013.01); *B01J 23/464* (2013.01);
(Continued)

(58) Field of Classification Search
CPC ............ B01J 23/38; B01J 23/40; B01J 23/42; B01J 23/44; B01J 23/46; B01J 23/54; B01J 23/56; B01J 21/02; B01J 21/08; B01J 35/02; B01J 35/04; B01J 35/10; B01D 53/945; F01N 3/021

USPC ......... 502/262, 263, 326, 327, 332–334, 339, 502/355, 415, 439, 527.12, 527.13; 422/170, 177, 180; 423/213.2, 213.5, 423/213.7; 60/299
See application file for complete search history.

(56) References Cited

U.S. PATENT DOCUMENTS

| | | | |
|---|---|---|---|
| 5,057,483 | A | 10/1991 | Wan |
| 5,473,887 | A | 12/1995 | Takeshima et al. |

(Continued)

FOREIGN PATENT DOCUMENTS

| | | |
|---|---|---|
| DE | 102004040548 A1 | 2/2006 |
| DE | 102010055147 A1 | 6/2012 |

(Continued)

OTHER PUBLICATIONS

GB Search Report dated Apr. 2, 2013 for corresponding United Kingdom Patent Application No. GB1301761.1.

(Continued)

*Primary Examiner* — Cam N. Nguyen
(74) *Attorney, Agent, or Firm* — Gary D. Mangels

(57) ABSTRACT

A catalyzed filter for a positive ignition internal combustion engine comprises a porous filtering substrate having a total substrate length coated with a three-way catalyst washcoat composition comprising at least one precious metal selected from the group consisting of rhodium and one or both of platinum and palladium supported on a high surface area oxide, and an oxygen storage component, which composition being axially shared by a first zone comprising inlet surfaces of a first substrate length<total substrate length and a second zone comprising outlet surfaces of a second substrate length<total substrate length, wherein a sum of the substrate length in the first zone and the substrate length in the second zone≥100% and wherein one or both of the following applies: a washcoat loading in the first zone>second zone; and a total precious metal loading in the first zone>second zone.

16 Claims, 3 Drawing Sheets

(51) Int. Cl.

| | | |
|---|---|---|
| *B01D 53/94* | (2006.01) | |
| *B01D 50/00* | (2006.01) | |
| *B01J 8/02* | (2006.01) | |
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |
| *F01N 3/10* | (2006.01) | |
| *B01J 23/00* | (2006.01) | |
| *B01J 23/02* | (2006.01) | |
| *B01J 23/06* | (2006.01) | |
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/70* | (2006.01) | |
| *B01J 23/74* | (2006.01) | |
| *B01J 21/04* | (2006.01) | |
| *F01N 3/035* | (2006.01) | |
| *B01J 35/00* | (2006.01) | |
| *B01J 23/46* | (2006.01) | |
| *B01J 23/63* | (2006.01) | |
| *B01J 35/10* | (2006.01) | |
| *B01J 37/02* | (2006.01) | |
| *B01J 35/04* | (2006.01) | |
| *B01J 37/00* | (2006.01) | |

(52) U.S. Cl.
CPC ............. *B01J 23/63* (2013.01); *B01J 35/0006* (2013.01); *B01J 35/10* (2013.01); *F01N 3/035* (2013.01); *F01N 3/101* (2013.01); *B01D 2255/1021* (2013.01); *B01D 2255/1023* (2013.01); *B01D 2255/1025* (2013.01); *B01D 2255/908* (2013.01); *B01D 2255/9032* (2013.01); *B01D 2255/9155* (2013.01); *B01D 2258/014* (2013.01); *B01J 35/04* (2013.01); *B01J 35/1033* (2013.01); *B01J 35/1076* (2013.01); *B01J 37/0036* (2013.01); *B01J 37/0248* (2013.01); *F01N 2330/48* (2013.01); *F01N 2510/068* (2013.01); *F01N 2510/0682* (2013.01); *Y02T 10/22* (2013.01)

(56) References Cited

U.S. PATENT DOCUMENTS

| | | | |
|---|---|---|---|
| 5,898,014 A | 4/1999 | Wu et al. | |
| 6,423,293 B1 | 7/2002 | Chun et al. | |
| 7,393,808 B2 | 7/2008 | Yoshida et al. | |
| 7,550,117 B2* | 6/2009 | Alward et al. | 422/177 |
| 7,572,416 B2* | 8/2009 | Alward et al. | 422/180 |
| 7,772,151 B2 | 8/2010 | Li et al. | |
| 7,785,544 B2* | 8/2010 | Alward et al. | 422/179 |
| 8,012,439 B2* | 9/2011 | Arnold et al. | 423/212 |
| 8,211,393 B2 | 7/2012 | Arnold et al. | |
| 8,404,203 B2 | 3/2013 | Bull et al. | |
| 8,475,752 B2* | 7/2013 | Wan | 423/213.2 |
| 8,512,657 B2 | 8/2013 | Arnold et al. | |
| 8,540,952 B2 | 9/2013 | Swallow et al. | |
| 8,608,820 B2 | 12/2013 | Arnold et al. | |
| 8,637,426 B2 | 1/2014 | Hoke et al. | |
| 8,640,440 B2 | 2/2014 | Klingmann et al. | |
| 8,652,429 B2* | 2/2014 | Sumiya et al. | 423/213.2 |
| 8,667,785 B2* | 3/2014 | Blakeman et al. | 60/299 |
| 8,668,891 B2* | 3/2014 | Blakeman et al. | 423/213.5 |
| 8,735,311 B2 | 5/2014 | Bull et al. | |
| 8,789,356 B2 | 7/2014 | Phillips et al. | |
| 8,795,617 B2 | 8/2014 | Swallow et al. | |
| 8,815,189 B2 | 8/2014 | Arnold et al. | |
| 8,919,110 B2 | 12/2014 | Arnold et al. | |
| 2003/0126133 A1 | 7/2003 | Dattatri et al. | |
| 2004/0191133 A1 | 9/2004 | Yamaguchi | |
| 2006/0039843 A1 | 2/2006 | Patchett et al. | |
| 2006/0057046 A1 | 3/2006 | Punke et al. | |
| 2007/0012028 A1 | 1/2007 | Weissman et al. | |
| 2007/0104623 A1 | 5/2007 | Dettling et al. | |
| 2008/0045405 A1 | 2/2008 | Beutel et al. | |
| 2008/0053070 A1 | 3/2008 | Hatton | |
| 2008/0124514 A1 | 5/2008 | Fujdala et al. | |
| 2009/0087365 A1 | 4/2009 | Klingmann et al. | |
| 2009/0129995 A1 | 5/2009 | Pfeifer et al. | |
| 2009/0193796 A1 | 8/2009 | Wei et al. | |
| 2009/0274602 A1 | 11/2009 | Alward et al. | |
| 2009/0288402 A1 | 11/2009 | Voss et al. | |
| 2010/0058746 A1 | 3/2010 | Pfeifer et al. | |
| 2010/0077727 A1 | 4/2010 | Southward et al. | |
| 2010/0077738 A1* | 4/2010 | Cavataio et al. | 60/301 |
| 2010/0092358 A1 | 4/2010 | Koegel et al. | |
| 2010/0126133 A1 | 5/2010 | Fekety et al. | |
| 2010/0189616 A1 | 7/2010 | Hodgson et al. | |
| 2010/0275579 A1 | 11/2010 | Klingmann et al. | |
| 2011/0158871 A1* | 6/2011 | Arnold et al. | 423/212 |
| 2011/0176969 A1 | 7/2011 | Michiaki et al. | |
| 2011/0179777 A1 | 7/2011 | Chandler et al. | |
| 2011/0185709 A1 | 8/2011 | Zhang et al. | |
| 2011/0201493 A1 | 8/2011 | Goto et al. | |
| 2011/0252773 A1 | 10/2011 | Arnold et al. | |
| 2011/0271664 A1 | 11/2011 | Boorse et al. | |
| 2012/0129690 A1 | 5/2012 | Larcher et al. | |
| 2012/0304623 A1 | 12/2012 | Springer et al. | |
| 2013/0149207 A1* | 6/2013 | Castagnola et al. | 422/177 |
| 2013/0149223 A1* | 6/2013 | Blakeman et al. | 423/213.5 |
| 2013/0243659 A1 | 9/2013 | Sutton et al. | |
| 2014/0154163 A1 | 6/2014 | Andersen et al. | |
| 2014/0186228 A1 | 7/2014 | Arnold et al. | |
| 2014/0186244 A1 | 7/2014 | Blakeman et al. | |
| 2014/0219879 A1 | 8/2014 | Bull et al. | |
| 2014/0227155 A1 | 8/2014 | Phillips et al. | |
| 2014/0234189 A1 | 8/2014 | Clowes et al. | |
| 2014/0271422 A1 | 9/2014 | Tang | |
| 2014/0271426 A1 | 9/2014 | Casci et al. | |
| 2014/0271429 A1 | 9/2014 | Kazi et al. | |
| 2014/0301923 A1 | 10/2014 | Tang et al. | |
| 2014/0301924 A1 | 10/2014 | Morgan | |
| 2014/0322112 A1 | 10/2014 | Blakeman et al. | |

FOREIGN PATENT DOCUMENTS

| | | |
|---|---|---|
| DE | 102011050788 A2 | 12/2012 |
| EP | 0766993 A3 | 4/1997 |
| EP | 1057519 A1 | 12/2000 |
| EP | 1108864 A2 | 6/2001 |
| EP | 1136115 A1 | 9/2001 |
| EP | 1663458 B1 | 1/2009 |
| EP | 2042225 A1 | 4/2009 |
| EP | 2042226 A2 | 4/2009 |
| EP | 2184459 A1 | 5/2010 |
| EP | 2650042 A1 | 10/2013 |
| FR | 2928176 A1 | 9/2009 |
| GB | 2406803 A | 4/2005 |
| GB | 2468210 B | 9/2010 |
| GB | 2476585 A | 6/2011 |
| GB | 2497441 A | 6/2013 |
| GB | 2497442 A | 6/2013 |
| JP | 2005264866 A | 9/2005 |
| WO | 9947260 A1 | 9/1999 |
| WO | 0116050 A1 | 3/2001 |
| WO | 0180978 A1 | 11/2001 |
| WO | 2006031600 A1 | 3/2006 |
| WO | 2007011498 A1 | 1/2007 |
| WO | 2008022967 A1 | 2/2008 |
| WO | 2008132452 A2 | 11/2008 |

(56) References Cited

FOREIGN PATENT DOCUMENTS

| | | | |
|---|---|---|---|
| WO | 2009043390 | A2 | 4/2009 |
| WO | 2009079590 | A1 | 6/2009 |
| WO | 2009089156 | A1 | 7/2009 |
| WO | 2009100097 | A2 | 8/2009 |
| WO | 2010004320 | A2 | 1/2010 |
| WO | 2010097634 | A1 | 9/2010 |
| WO | 2011015615 | A1 | 2/2011 |
| WO | 2011077139 | A1 | 6/2011 |
| WO | 2011080525 | A1 | 7/2011 |
| WO | 2011110919 | A1 | 9/2011 |
| WO | 2012069405 | A1 | 5/2012 |
| WO | 2014174277 | A1 | 10/2014 |

OTHER PUBLICATIONS

GB Search Report dated Apr. 2, 2013 for corresponding United Kingdom Patent Application No. GB1301893.2.

GB Search Report dated Nov. 4, 2013 for corresponding United Kingdom Patent Application No. GB1307384.6.

Abdul-Khalek, I.S. et al., "Diesel Exhaust Particle Size: Measurement Issues and Trends," 1998, Society of Automotive Engineers, Inc., SAE 980525.

Wei, Qiang, Kittelson, David B., Watts, Winthrop F., "Single-Stage Dilution Tunnel Performance," 2001, Society of Automotive Engineers, Inc., SAE 2001-01-0201.

Hall, D.E., and Dickens, C.J., "Measurement of the Number and Size Distribution of Particles Emitted from a Gasoline Direct Injection Vehicle," 1999, Society of Automotive Engineers, Inc., SAE 1999-01-3530.

Howitt, John S., Montierth, Max R., "Cellular Ceramic Diesel Particulate Filter," 1981, Society of Automotive Engineers, Inc., SAE 810114.

GB Search Report dated Aug. 24, 2012, for corresponding United Kingdom Patent Application No. GB1207313.6.

* cited by examiner

FILTER SUBSTRATE COMPRISING THREE-WAY CATALYST

CROSS REFERENCE TO RELATED APPLICATIONS

This invention claims the priority benefit of U.S. Provisional Patent Application No. 61/637,545 filed on Apr. 24, 2012 and Great Britain Patent Application No. 1207313.6, filed on Apr. 27, 2012, the disclosures of which are incorporated herein by reference in their entirety.

FIELD OF THE INVENTION

The present invention relates to a filter catalysed with a three-way catalyst for filtering particulate matter from exhaust gas emitted from a positive ignition internal combustion engine.

BACKGROUND TO THE INVENTION

Positive ignition engines cause combustion of a hydrocarbon and air mixture using spark ignition. Contrastingly, compression ignition engines cause combustion of a hydrocarbon by injecting the hydrocarbon into compressed air. Positive ignition engines can be fueled by gasoline fuel, gasoline fuel blended with oxygenates including methanol and/or ethanol, liquid petroleum gas or compressed natural gas.

A three-way catalyst (TWC) typically contains one or more platinum group metals, particularly those selected from the group consisting of platinum, palladium and rhodium.

TWCs are intended to catalyse three simultaneous reactions: (i) oxidation of carbon monoxide to carbon dioxide, (ii) oxidation of unburned hydrocarbons to carbon dioxide and water; and (iii) reduction of nitrogen oxides to nitrogen and oxygen. These three reactions occur most efficiently when the TWC receives exhaust gas from an engine running at or about the stoichiometric point. As is well known in the art, the quantity of carbon monoxide (CO), unburned hydrocarbons (HC) and nitrogen oxides ($NO_x$) emitted when gasoline fuel is combusted in a positive ignition (e.g. spark-ignited) internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces this stoichiometrically balanced exhaust gas composition is typically given as 14.7:1.

Theoretically, it should be possible to achieve complete conversion of $O_2$, $NO_x$, CO and HC in a stoichiometrically balanced exhaust gas composition to $CO_2$, $H_2O$ and $N_2$ (and residual $O_2$) and this is the duty of the TWC. Ideally, therefore, the engine should be operated in such a way that the air-to-fuel ratio of the combustion mixture produces the stoichiometrically balanced exhaust gas composition.

A way of defining the compositional balance between oxidising gases and reducing gases of the exhaust gas is the lambda (2) value of the exhaust gas, which can be defined according to equation (1) as:

Actual engine air-to-fuel ratio/Stoichiometric engine air-to-fuel ratio, (1)

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates: hence stoichiometrically-operated gasoline engine or lean-burn gasoline engine.

It should be appreciated that the reduction of $NO_x$ to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas flowing into the TWC at as close to the stoichiometric composition as possible.

Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

The active components in a typical TWC comprise one or both of platinum and palladium in combination with rhodium, or even palladium only (no rhodium), supported on a high surface area oxide, and an oxygen storage component.

When the exhaust gas composition is slightly rich of the set point, there is a need for a small amount of oxygen to consume the unreacted CO and HC, i.e. to make the reaction more stoichiometric. Conversely, when the exhaust gas goes slightly lean, the excess oxygen needs to be consumed. This was achieved by the development of the oxygen storage component that liberates or absorbs oxygen during the perturbations. The most commonly used oxygen storage component (OSC) in modern TWCs is cerium oxide ($CeO_2$) or a mixed oxide containing cerium, e.g. a Ce/Zr mixed oxide.

Ambient PM is divided by most authors into the following categories based on their aerodynamic diameter (the aerodynamic diameter is defined as the diameter of a 1 $g/cm^3$ density sphere of the same settling velocity in air as the measured particle):

(i) PM-10—particles of an aerodynamic diameter of less than 10 μm;
(ii) Fine particles of diameters below 2.5 μm (PM-2.5);
(iii) Ultrafine particles of diameters below 0.1 μm (or 100 nm); and
(iv) Nanoparticles, characterised by diameters of less than 50 nm.

Since the mid-1990's, particle size distributions of particulates exhausted from internal combustion engines have received increasing attention due to possible adverse health effects of fine and ultrafine particles. Concentrations of PM-10 particulates in ambient air are regulated by law in the USA. A new, additional ambient air quality standard for PM-2.5 was introduced in the USA in 1997 as a result of health studies that indicated a strong correlation between human mortality and the concentration of fine particles below 2.5 μm.

Interest has now shifted towards nanoparticles generated by diesel and gasoline engines because they are understood to penetrate more deeply into human lungs than particulates of greater size and consequently they are believed to be more harmful than larger particles, extrapolated from the findings of studies into particulates in the 2.5-10.0 µm range.

Size distributions of diesel particulates have a well-established bimodal character that correspond to the particle nucleation and agglomeration mechanisms, with the corresponding particle types referred to as the nuclei mode and the accumulation mode respectively (see FIG. 1). As can be seen from FIG. 1, in the nuclei mode, diesel PM is composed of numerous small particles holding very little mass. Nearly all diesel particulates have sizes of significantly less than 1 µm, i.e. they comprise a mixture of fine, i.e. falling under the 1997 US law, ultrafine and nanoparticles.

Nuclei mode particles are believed to be composed mostly of volatile condensates (hydrocarbons, sulfuric acid, nitric acid etc.) and contain little solid material, such as ash and carbon. Accumulation mode particles are understood to comprise solids (carbon, metallic ash etc.) intermixed with condensates and adsorbed material (heavy hydrocarbons, sulfur species, nitrogen oxide derivatives etc.) Coarse mode particles are not believed to be generated in the diesel combustion process and may be formed through mechanisms such as deposition and subsequent re-entrainment of particulate material from the walls of an engine cylinder, exhaust system, or the particulate sampling system. The relationship between these modes is shown in FIG. 1.

The composition of nucleating particles may change with engine operating conditions, environmental condition (particularly temperature and humidity), dilution and sampling system conditions. Laboratory work and theory have shown that most of the nuclei mode formation and growth occur in the low dilution ratio range. In this range, gas to particle conversion of volatile particle precursors, like heavy hydrocarbons and sulfuric acid, leads to simultaneous nucleation and growth of the nuclei mode and adsorption onto existing particles in the accumulation mode. Laboratory tests (see e.g. SAE 980525 and SAE 2001-01-0201) have shown that nuclei mode formation increases strongly with decreasing air dilution temperature but there is conflicting evidence on whether humidity has an influence.

Generally, low temperature, low dilution ratios, high humidity and long residence times favour nanoparticles formation and growth. Studies have shown that nanoparticles consist mainly of volatile material like heavy hydrocarbons and sulfuric acid with evidence of solid fraction only at very high loads.

Contrastingly, engine-out size distributions of gasoline particulates in steady state operation show a unimodal distribution with a peak of about 60-80 nm (see e.g. FIG. 4 in SAE 1999-01-3530). By comparison with diesel size distribution, gasoline PM is predominantly ultrafine with negligible accumulation and coarse mode.

Particulate collection of diesel particulates in a diesel particulate filter is based on the principle of separating gas-borne particulates from the gas phase using a porous barrier. Diesel filters can be defined as deep-bed filters and/or surface-type filters. In deep-bed filters, the mean pore size of filter media is bigger than the mean diameter of collected particles. The particles are deposited on the media through a combination of depth filtration mechanisms, including diffusional deposition (Brownian motion), inertial deposition (impaction) and flow-line interception (Brownian motion or inertia).

In surface-type filters, the pore diameter of the filter media is less than the diameter of the PM, so PM is separated by sieving. Separation is done by a build-up of collected diesel PM itself, which build-up is commonly referred to as "filtration cake" and the process as "cake filtration".

It is understood that diesel particulate filters, such as ceramic wallflow monoliths, may work through a combination of depth and surface filtration: a filtration cake develops at higher soot loads when the depth filtration capacity is saturated and a particulate layer starts covering the filtration surface. Depth filtration is characterized by somewhat lower filtration efficiency and lower pressure drop than the cake filtration.

Other techniques suggested in the art for separating gasoline PM from the gas phase include vortex recovery.

Emission legislation in Europe from 1 Sep. 2014 (Euro 6) requires control of the number of particles emitted from both diesel and gasoline (positive ignition) passenger cars. For gasoline EU light duty vehicles the allowable limits are: 1000 mg/km carbon monoxide; 60 mg/km nitrogen oxides ($NO_x$); 100 mg/km total hydrocarbons (of which <68 mg/km are non-methane hydrocarbons); and 4.5 mg/km particulate matter ((PM) for direct injection engines only). The Euro 6 PM standard will be phased in over a number of years with the standard from the beginning of 2014 being set at $6.0 \times 10^{12}$ per km (Euro 6) and the standard set from the beginning of 2017 being $6.0 \times 10^{11}$ per km (Euro 6+).

It is understood that the US Federal LEV III standards have been set at 3 mg/mile mass limit (currently 10 mg/mile) over US FTP cycle from 2017-2021. The limit is then yet further tightened to 1 mg/mile from 2025, although implementation of this lower standard may be brought forward to 2022.

The new Euro 6 (Euro 6 and Euro 6+) emission standard presents a number of challenging design problems for meeting gasoline emission standards. In particular, how to design a filter, or an exhaust system including a filter, for reducing the number of PM gasoline (positive ignition) emissions, yet at the same time meeting the emission standards for non-PM pollutants such as one or more of oxides of nitrogen ($NO_x$), carbon monoxide (CO) and unburned hydrocarbons (HC), all at an acceptable back pressure, e.g. as measured by maximum on-cycle backpressure on the EU drive cycle.

It is envisaged that a minimum of particle reduction for a three-way catalysed particulate filter to meet the Euro 6 PM number standard relative to an equivalent flowthrough catalyst is ≥50%. Additionally, while some backpressure increase for a three-way catalysed wallflow filter relative to an equivalent flowthrough catalyst is inevitable, in our experience peak backpressure over the MVEG-B drive cycle (average over three tests from "fresh") for a majority of passenger vehicles should be limited to <200 mbar, such as <180 mbar, <150 mbar and preferably <120 mbar e.g. <100 mbar.

There have been a number of recent efforts to combine TWCs with filters for meeting the Euro 6 emission standards.

US 2009/0193796 discloses an emission treatment system downstream of a gasoline direct injection engine for treatment of an exhaust gas comprising hydrocarbons, carbon monoxide, nitrogen oxides and particulates, the emission treatment system comprising a catalysed particulate trap comprising a three-way conversion (TWC) catalyst coated onto or within a particulate trap.

WO 2010/0275579 discloses a catalytically active particulate filter comprising a filter element and a catalytically active coating composed of two layers. The first layer is in contact with the in-flowing exhaust gas while the second layer is in contact with the out-flowing exhaust gas. Both layers contain aluminium oxide. The first layer contains palladium, the second layer contains an oxygen-storing mixed cerium/zirconium oxide in addition to rhodium.

WO 2010/097634 discloses a filter for filtering particulate matter (PM) from exhaust gas emitted from a positive ignition engine, which filter comprising a porous substrate having inlet surfaces and outlet surfaces, wherein the inlet surfaces are separated from the outlet surfaces by a porous structure containing pores of a first mean pore size, wherein the porous substrate is coated with a washcoat comprising a plurality of solid particles wherein the porous structure of the washcoated porous substrate contains pores of a second mean pore size, and wherein the second mean pore size is less than the first mean pore size. In embodiments, the washcoat is catalysed and in a particular embodiment the catalyst is a TWC.

EP 1136115 A1 discloses a three way catalyst for purifying an exhaust gas comprising an upstream side catalyst and a downstream side catalyst.

We have now discovered that, very surprisingly, for a neutral overall precious metal content, back pressure can be reduced and hydrocarbon conversion improved yet particulate number reduction maintained relative to a filter substrate homogeneously washcoated with a three-way catalyst composition by rearranging the components of the three-way catalyst between upstream and downstream zones.

SUMMARY OF THE INVENTION

According to one aspect, the invention provides a catalysed filter for filtering particulate matter from exhaust gas emitted from a positive ignition internal combustion engine, which filter comprising a porous substrate having a total substrate length and having inlet surfaces and outlet surfaces, wherein the inlet surfaces are separated from the outlet surfaces by a porous structure containing pores of a first mean pore size, wherein the porous substrate is coated with a three-way catalyst washcoat comprising a plurality of solid particles and at least one precious metal, wherein the porous structure of the washcoated porous substrate contains pores of a second mean pore size, wherein the second mean pore size is less than the first mean pore size, which three-way catalyst washcoat being axially arranged on the porous substrate between a first zone comprising the inlet surfaces of a first substrate length less than the total substrate length and a second zone comprising the outlet surfaces of a second substrate length less than the total substrate length, wherein the sum of the substrate length in the first zone and the substrate length in the second zone≥100% and wherein:

(i) a washcoat loading in the first zone>second zone;
(ii) a total precious metal loading in the first zone>second zone; or
(iii) both a washcoat loading and a total precious metal loading in the first zone>second zone.

DETAILED DESCRIPTION OF THE INVENTION

Figure 1:
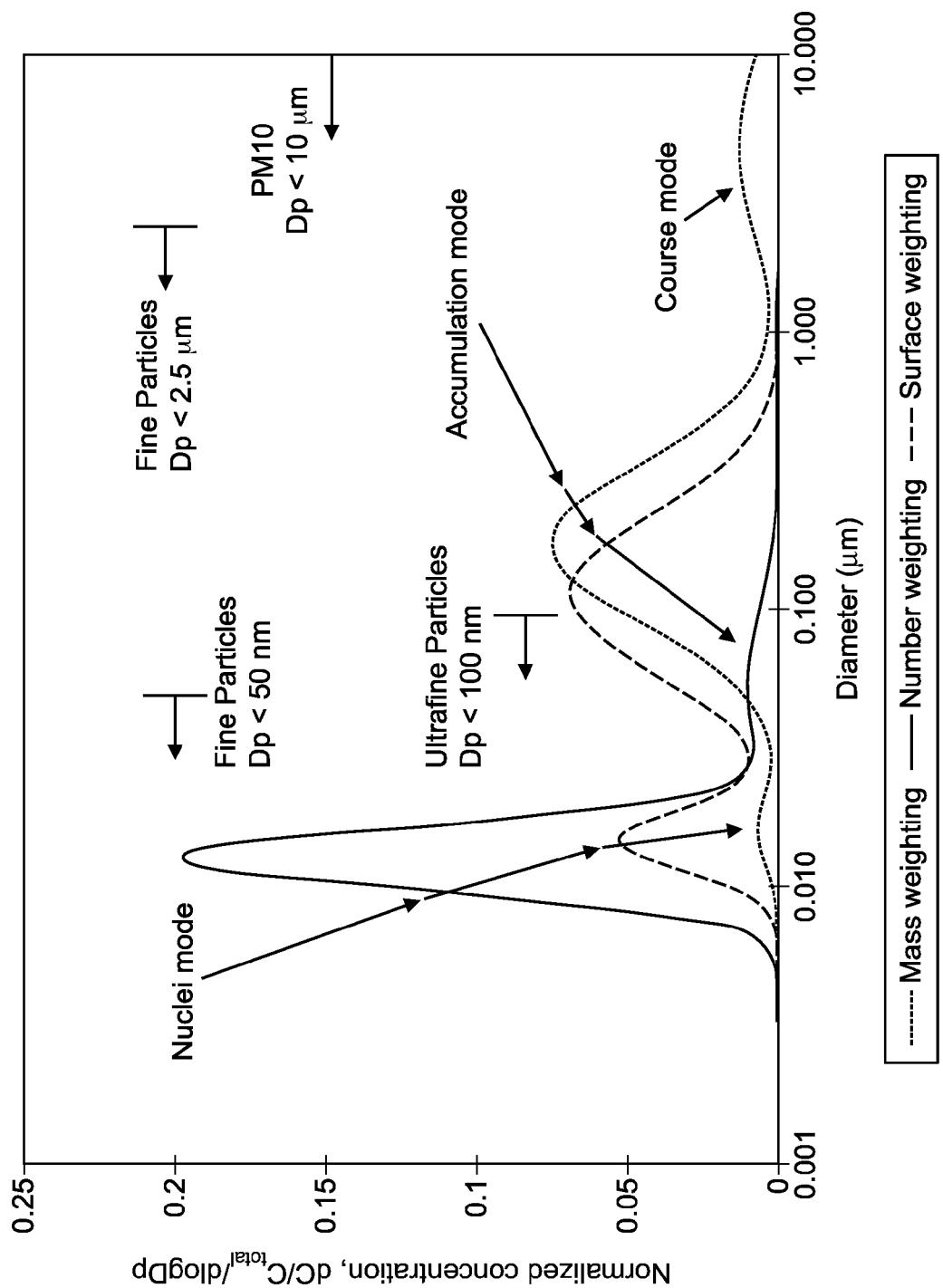
FIG. 1 is a graph showing the size distributions of PM in the exhaust gas of a diesel engine. For comparison, a gasoline size distribution is shown at FIG. 4 of SAE 1999-01-3530.

According to one aspect, the invention provides a catalysed filter for filtering particulate matter from exhaust gas emitted from a positive ignition internal combustion engine, which filter comprising a porous substrate having a total substrate length and having inlet surfaces and outlet surfaces, wherein the inlet surfaces are separated from the outlet surfaces by a porous structure containing pores of a first mean pore size, wherein the porous substrate is coated with a three-way catalyst washcoat comprising a plurality of solid particles and at least one precious metal, wherein the porous structure of the washcoated porous substrate contains pores of a second mean pore size, wherein the second mean pore size is less than the first mean pore size, which three-way catalyst washcoat being axially arranged on the porous substrate between a first zone comprising the inlet surfaces of a first substrate length less than the total substrate length and a second zone comprising the outlet surfaces of a second substrate length less than the total substrate length, wherein the sum of the substrate length in the first zone and the substrate length in the second zone≥100% and wherein:

(iv) a washcoat loading in the first zone>second zone;
(v) a total precious metal loading in the first zone>second zone; or
both a washcoat loading and a total precious metal loading in the first zone>second zone.

For the washcoat loading and total precious metal loading in features (i) and (ii) but not specifically mentioned in the definition of feature (i) or (ii), such feature is homogeneously applied between the inlet and outlet surfaces. So, for example, since feature (i) defines only the washcoat loading, the total precious metal loading is substantially the same (homogeneous) in both the first zone and the second zone. Similarly, in feature (ii), the total precious metal loading is defined. Therefore, the washcoat loading is homogeneously applied between the first zone and the second zone.

Positive ignition internal combustion engines, such as spark ignition internal combustion engines, for use in this aspect of the invention can be fuelled by gasoline fuel, gasoline fuel blended with oxygenates including methanol and/or ethanol, liquid petroleum gas or compressed natural gas.

Mean pore size can be determined by mercury porosimetry.

The porous substrate is preferably a monolith substrate and can be a metal, such as a sintered metal, or a ceramic, e.g. silicon carbide, cordierite, aluminium nitride, silicon nitride, aluminium titanate, alumina, mullite e.g., acicular mullite (see e.g. WO 01/16050), pollucite, a thermet such as $Al_2O_3$/Fe, $Al_2O_3$/Ni or $B_4C$/Fe, or composites comprising segments of any two or more thereof. In a preferred embodiment, the filter is a wallflow filter comprising a ceramic porous filter substrate having a plurality of inlet channels and a plurality of outlet channels, wherein each inlet channel and each outlet channel is defined in part by a ceramic wall of porous structure, wherein each inlet channel is separated from an outlet channel by a ceramic wall of porous structure. This filter arrangement is also disclosed in SAE 810114, and reference can be made to this document for further details. Alternatively, the filter can be a foam, or a so-called partial filter, such as those disclosed in EP 1057519 or WO 01/080978.

It is a particular feature of the present invention that washcoat loadings used in the first, upstream zone can be higher than the previously regarded highest washcoat loadings, e.g. those disclosed in the Examples in WO 2010/097634. In a particular embodiment, the washcoat loading in the first zone is >1.60 g in$^{-3}$, and in preferred embodiments the washcoat loading in the first zone is >2.4 g in$^{-3}$.

In the catalysed filter according to the invention, the sum of the substrate length in the first zone and the substrate length in the second zone≥100%, i.e. there is no gap in the axial direction, or there is axial overlap, between the first zone on the inlet surface and the second zone on the outlet surface.

The length of axial overlap between inlet and outlet surface coatings can be >10%, e.g. 10-30%, i.e. the sum of the substrate length in the first zone and the substrate length in the second zone>110%, e.g. 110-130%.

The substrate length in the first zone can be the same as or different from that of the second zone. So, where the first zone length is the same as the second zone length the porous substrate is coated in a ratio of 1:1 between the inlet surface and the outlet surface. However, in one embodiment, the substrate length in the first zone<the substrate length in the second zone.

In embodiments, the substrate length in the first zone<the substrate length in the second zone, e.g. <45%. In preferred embodiments, the substrate zone length in the first zone is <40%, e.g. <35% of the total substrate length.

In the catalysed filter of feature (ii) or (iii), the total precious metal loading in the first zone>the total precious metal loading in the second zone. In particularly preferred embodiments, the total precious metal loading in the first zone is >50 gft$^{-3}$, but is preferably between 60-250 gft$^{-3}$, and is typically from 70-150 gft$^{-3}$. Total precious metal loadings in the second zone can be e.g. <50 gft$^{-3}$, e.g. <30 gft$^{-3}$ such as <20 gft$^{-3}$.

Figure 2:
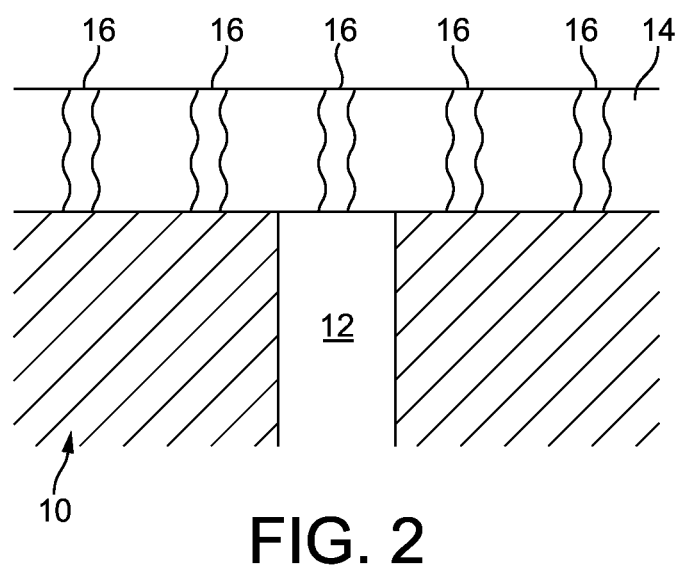
FIG. 2 is a schematic drawing of an embodiment of a washcoated porous filter substrate according to the invention.

In preferred embodiments, the first and second zones comprise a surface washcoat, wherein a washcoat layer substantially covers surface pores of the porous structure and the pores of the washcoated porous substrate are defined in part by spaces between the particles (interparticle pores) in the washcoat. Methods of making surface coated porous filter substrates include introducing a polymer, e.g. polyvinyl alcohol (PVA), into the porous structure, applying a washcoat to the porous filter substrate including the polymer and drying, then calcining the coated substrate to burn out the polymer. A schematic representation of the first embodiment is shown in FIG. 2.

Methods of coating porous filter substrates are known to the skilled person and include, without limitation, the method disclosed in WO 99/47260, i.e. a method of coating a monolithic support, comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. Such process steps can be repeated from another end of the monolithic support following drying of the first coating with optional firing/calcination.

Alternatively, the method disclosed in WO 2011/080525 can be used, i.e. comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

In this preferred embodiment, an average interparticle pore size of the porous washcoat is 5.0 nm to 5.0 μm, such as 0.1-1.0 μm.

As explained hereinabove, TWC composition generally comprises one or both of platinum and palladium in combination with rhodium, or even palladium only (no rhodium), supported on a high surface area oxide, e.g. gamma alumina, and an oxygen storage component, e.g. comprising a mixed oxide comprising cerium. In embodiments, the mean size (D50) of the solid washcoat particles is in the range 1 to 40 μm. In practice, the oxygen storage components may have a different particle size from the high surface area oxide. So, an OSC may have a D50 between 1-10 μm, such as from 4 and 6 μm; and a high surface area oxide may have a D50 of between 1-10 μm, such as from 4 and 6 μm.

In further embodiments, the D90 of solid washcoat particles is in the range of from 0.1 to 20 μm. Again, the D90 of the OSC may be different from that of the high surface area oxide. So, the D90 of the OSC can be <18 μm and the D90 of the high surface area oxide can be <20 μm.

Preferably, the porous substrate is a monolith substrate. In particularly preferred embodiments, the porous substrate for use in the present invention is a ceramic wall flow filter made from e.g. cordierite, or silicon carbide or any of the other materials described hereinabove. However, substrate monoliths other than flow-through monoliths can be used as desired, e.g. partial filters (see e.g. WO 01/080978 or EP 1057519), metal foam substrates etc.

The cell density of diesel wallflow filters in practical use can be different from wallflow filters for use in the present invention in that the cell density of diesel wallflow filters is generally 300 cells per square inch (cpsi) or less, e.g. 100 or 200 cpsi, so that the relatively larger diesel PM components can enter inlet channels of the filter without becoming impacted on the solid frontal area of the diesel particulate filter, thereby caking and fouling access to the open channels, whereas wallflow filters for use in the present invention can be up to 300 cpsi or greater, such as 350 cpsi, 400, cpsi, 600 cpsi, 900 cpsi or even 1200 cpsi.

An advantage of using higher cell densities is that the filter can have a reduced cross-section, e.g. diameter, than diesel particulate filters, which is a useful practical advantage that increases design options for locating exhaust systems on a vehicle.

It will be understood that the benefit of filters for use in the invention is substantially independent of the porosity of the uncoated porous substrate. Porosity is a measure of the percentage of void space in a porous substrate and is related to backpressure in an exhaust system: generally, the lower the porosity, the higher the backpressure. However, the porosity of filters for use in the present invention are typically >40% or >50% and porosities of 45-75% such as 50-65% or 55-60% can be used with advantage. The mean pore size of the washcoated porous substrate is important for filtration. So, it is possible to have a porous substrate of relatively high porosity that is a poor filter because the mean pore size is also relatively high.

In embodiments, the first mean pore size e.g. of surface pores of the porous structure of the porous filter substrate is from 8 to 45 μm, for example 8 to 25 μm, 10 to 20 μm or 10 to 15 μm. In particular embodiments, the first mean pore size is >18 μm such as from 15 to 45 μm, 20 to 45 μm e.g. 20 to 30 μm, or 25 to 45 μm.

According to a second aspect, the present invention provides an exhaust system for a positive ignition internal combustion engine comprising a catalysed filter according to the first aspect of the present invention, wherein the first zone is disposed upstream of the second zone.

In a preferred embodiment, the exhaust system comprises a flow through monolith substrate comprising a three-way catalyst composition disposed upstream of the catalysed filter.

According to a third aspect, the invention provides a positive ignition engine comprising an exhaust system according to the second aspect of the present invention.

The filter according to the invention could obviously be used in combination with other exhaust system aftertreatment components to provide a full exhaust system aftertreatment apparatus, e.g. a low thermal mass TWC upstream of the filter and/or downstream catalytic elements, e.g. $NO_x$ trap or SCR catalyst, according to specific requirements. So, in vehicular positive ignition applications producing relatively cool on-drive cycle exhaust gas temperatures, we contemplate using a low thermal mass TWC disposed upstream of the filter according to the invention. For vehicular lean-burn positive ignition applications, we envisage using a filter according to the invention upstream or downstream of a $NO_x$ trap. In vehicular stoichiometrically-operated positive ignition engines, we believe that the filter according to the present invention can be used as a standalone catalytic exhaust system aftertreatment component. That is, in certain applications the filter according to the present invention is adjacent and in direct fluid communication with the engine without intervening catalysts therebetween; and/or an exit to atmosphere from an exhaust gas aftertreatment system is adjacent to and in direct fluid communication with the filter according to the present invention without intervening catalysts therebetween.

An additional requirement of a TWC is a need to provide a diagnosis function for its useful life, so called "on-board diagnostics" or OBD. A problem in OBD arises where there is insufficient oxygen storage capacity in the TWC, because OBD processes for TWCs use remaining oxygen storage capacity to diagnose remaining catalyst function. However, if insufficient washcoat is loaded on the filter such as in the specific Examples disclosed in US 2009/0193796 and WO 2009/043390, there may not be enough OSC present to provide an accurate OSC "delta" for OBD purposes. Since the present invention enables washcoat loadings approaching current state-of-the-art TWCs, the filters for use in the present invention can be used with advantage in current OBD processes.

According to a fourth aspect, the invention provides a method of simultaneously converting carbon monoxide, hydrocarbons, oxides of nitrogen and particulate matter in the exhaust gas of a positive ignition internal combustion engine, which method comprising the step of contacting the gas with a catalysed filter according to the first aspect of the present invention.

Figure 3:
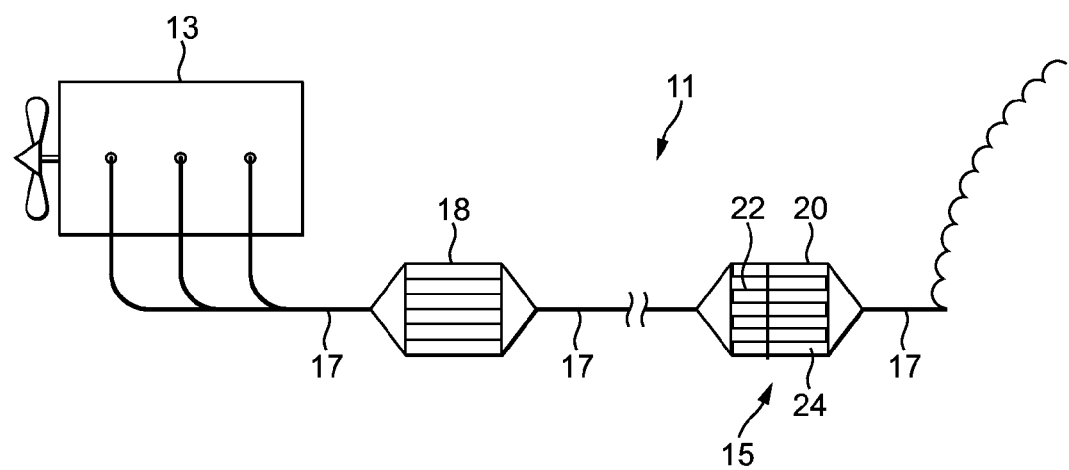
FIG. 3 is a schematic drawing of an embodiment of an exhaust system according to the invention.

In order that the invention may be more fully understood, reference is made to the accompanying drawings wherein:

FIG. 1 is a graph showing the size distributions of PM in the exhaust gas of a diesel engine. For comparison, a gasoline size distribution is shown at FIG. 4 of SAE 1999-01-3530;

FIG. 2 is a schematic drawing of an embodiment of a washcoated porous filter substrate according to the invention; and FIG. 3 is a schematic drawing of an embodiment of an exhaust system according to the invention.

FIG. 2 shows a cross-section through a porous filter substrate 10 comprising a surface pore 12. FIG. 2 shows an embodiment, featuring a porous surface washcoat layer 14 comprised of solid washcoat particles, the spaces between which particles define pores (interparticle pores). It can be seen that the washcoat layer 14 substantially covers the pore 12 of the porous structure and that a mean pore size of the interparticle pores 16 is less than the mean pore size 12 of the porous filter substrate 10.

FIG. 3 shows an apparatus 11 according to the invention comprising a vehicular positive ignition engine 13 and an exhaust system 15 therefor. Exhaust system 15 comprises a conduit 17 linking catalytic aftertreatment components, namely a Pd—Rh-based TWC coated onto an inert cordierite flowthrough substrate 18 disposed close to the exhaust manifold of the engine (the so-called close coupled position). Downstream of the close-coupled catalyst 18 in turn is a zoned Pd—Rh-based TWC coated onto a cordierite wall-flow filter 20 having a total length and comprising inlet channels coated to a length of one third of the total length measured from an upstream or inlet end of the wall-flow filter with a washcoat loading of 2.8 $gin^{-3}$ comprising a relatively high precious metal loading of 85 $gft^{-3}$ (80Pd:5Rh), which coating defining a first zone 22. The outlet channels are coated with a Pd—Rh-based TWC coated on two thirds of the total length of the wall-flow filter measured from the downstream or outlet end of the wall-flow filter with a washcoat loading of 1.0 $gin^{-3}$ comprising a relatively low precious metal loading of 18 $gft^{-3}$ (16Pd:2Rh), which coating defining a second zone 24.

EXAMPLES

In order that the invention may be more fully understood the following Examples are provided by way of illustration only. The washcoat loadings quoted in the Examples were obtained using the method disclosed in WO 2011/080525.

Example 1

Two cordierite wall-flow filters of dimensions 4.66×5.5 inches, 300 cells per square inch, wall thickness 13 thousandths of an inch and having a mean pore size of 20 μm and a porosity of 65% were each coated with a TWC composition in a different configuration from the other. In each case, the TWC composition was milled to a d90<17 μm) so that the coating when applied would be expected preferentially to locate more at the surface of a wallflow filter wall ("on-wall").

A first filter (referred to in Table 1 as having a "Homogeneous" washcoat loading) was coated in channels intended for the inlet side of the filter with a TWC washcoat zone extending for a targeted 33.3% of the total length of the filter substrate measured from the open channel ends with a washcoat comprising a precious metal loading of 85 $g/ft^3$ (80Pd:5Rh) and at a washcoat loading of 2.4 $g/in^3$. The outlet channels were coated to a length of 66.6% of the total length of the filter substrate measured from the open channel ends with a washcoat comprising a precious metal loading of 18 $g/ft^3$ (16Pd:2Rh) at a washcoat loading also of 2.4 $g/in^3$. X-ray imaging was used to ensure that an overlap occurred in the longitudinal plane between the inlet channel zone and the outlet channel zone. So, the washcoat loading was homogeneous between the first and second zones, but the platinum group metal loading in the first zone>second zone. That is, the first filter is according to claim 1, feature (ii).

A second filter (referred to in Table 1 as having a "Zoned" washcoat loading) was coated in the inlet channels with a TWC washcoat zone extending for a targeted 33.33% of the total length of the filter substrate measured from the open channel ends with a washcoat comprising a precious metal loading of 85 $g/ft^3$ (80Pd:5Rh) and at a washcoat loading of 2.8 $g/in^3$. The outlet channels were coated to a length of 66.66% of the total length of the filter substrate measured from the open channel ends with a washcoat comprising a precious metal loading of 18 $g/ft^3$ (16Pd:2Rh) at a washcoat loading of 1.0 $g/in^3$. X-ray imaging was used to ensure that an overlap occurred in the longitudinal plane between the inlet channel zone and the outlet channel zone. So, both the washcoat loading and the platinum group metal loading in the first zone>second zone. That is, the second filter is according to claim 1, feature (iii).

The total precious metal content of the first and second filters was identical.

Each filter was hydrothermally oven-aged at 1100° C. for 4 hours and installed in a close-coupled position on a Euro 5 passenger car with a 2.0 L direct injection gasoline engine. Each filter was evaluated over a minimum of three MVEG-B drive cycles, measuring the reduction in particle number emissions relative to a reference catalyst. The reference catalyst was a TWC coated homogeneously onto a 600 cells per square inch cordierite flowthrough substrate monolith having the same dimensions as the first and second filters and at a washcoat loading of 3 gin$^{-3}$ and a precious metal loading of 33 gft$^{-3}$ (30Pd:3Rh). The backpressure differential was determined between sensors mounted upstream and downstream of the filter (or reference catalyst).

In Europe, since the year 2000 (Euro 3 emission standard) emissions are tested over the New European Driving Cycle (NEDC). This consists of four repeats of the previous ECE 15 driving cycle plus one Extra Urban Driving Cycle (EUDC) with no 40 second warm-up period before beginning emission sampling. This modified cold start test is also referred to as the "MVEG-B" drive cycle. All emissions are expressed in g/km.

The Euro 5/6 implementing legislation introduces a new PM mass emission measurement method developed by the UN/ECE Particulate Measurement Programme (PMP) which adjusts the PM mass emission limits to account for differences in results using old and the new methods. The Euro 5/6 legislation also introduces a particle number emission limit (PMP method), in addition to the mass-based limits.

The results of the tests are shown in Table 1, from which it can be seen that the filter washcoated in the zoned configuration shows improved back pressure and has good (though moderately lower) levels of particle number reduction relative to the homogeneously washcoated filter. Despite the moderate reduction in lower particle number reduction, the second filter would still meet the full Euro 6+(2017) standard limit.

TABLE 1

Effect of washcoat zoning on particle number reduction and backpressure (BP)

| Sample filter properties | Washcoat type | % PN reduction vs. flow through reference | Average BP (mbar) on 70 kph cruise of MVEG-B drive cycle | Peak BP (mbar) during any one MVEG-B drive cycle |
|---|---|---|---|---|
| 20 μm, 65% | Homogeneous | 85 | 17.6 | 82.1 |
| 20 μm, 65% | Zoned | 81 | 12.2 | 59.5 |

Example 2

Two cordierite wall-flow filters of dimensions 4.66×4.5 inches, 300 cells per square inch, wall thickness 13 thousandths of an inch, mean pore size of 20 μm and a porosity of 65% were each coated with a TWC composition in a different configuration from the other. In each case, the TWC composition was milled to a d90<17 μm) so that the coating when applied would be expected preferentially to locate more at the surface of a wallflow filter wall ("on-wall").

A third filter (referred to in Table 2 as having a "Homogeneous" platinum group metal loading (Comparative Example)) was coated in channels intended for the inlet side of the filter and outlet side of the filter with a TWC washcoat zone extending for a targeted 50% of the total length of the filter substrate measured from the open channel ends with a washcoat comprising a precious metal loading of 60 gft$^{-3}$ (57Pd:3Rh) and at a washcoat loading of 2.4 g/in$^3$.

A fourth filter (referred to in Table 2 as having a "Zoned" PGM loading) was coated in channels intended for the inlet side of the filter with a TWC washcoat zone extending for a targeted 50% of the total length of the filter substrate measured from the open channel ends with a washcoat comprising 100 g/ft$^{-3}$ precious metal (97Pd:3Rh) at a washcoat loading of 2.4 g/in$^3$; and the outlet channels were coated with a TWC washcoat zone extending for a targeted 50% of the total length of the filter substrate measured from the open channel ends with a washcoat comprising 20 g/ft$^{-3}$ precious metal (17Pd:3Rh), also at a washcoat loading of 2.4 g/in$^3$. That is, the fourth filter is according to claim 1, feature (ii).

The total precious metal content of the third and fourth filters was identical.

Each filter was hydrothermally oven-aged at 1100° C. for 4 hours and installed in a close-coupled position on a Euro 5 passenger car with a 1.4 L direct injection gasoline engine. Each filter was evaluated over a minimum of three MVEG-B drive cycles, measuring the reduction in particle number emissions relative to a reference catalyst. Peak backpressure (BP) was also evaluated in the same way as described in Example 1.

Hydrocarbon light-off temperature (the temperature at which the catalyst catalyses the conversion of hydrocarbons in the feed gas at 50% efficiency or greater) was evaluated on a separate engine mounted in a laboratory test cell. This engine was a 2.0 liter turbo charged direct injection gasoline engine. The exhaust gas temperature was carefully regulated and increased from 250-450° C. over a given period of time through the use of a combination of a temperature heat sink and increasing throttle position, during which time the conversion efficiency of the catalyst was measured and reported.

The results of zone coating the precious metal in the filter substrate are shown in Table 2, from which it can be seen that—as could be expected with identical washcoat loadings between the two filters—the % particle number reduction vs. the flow through reference catalyst (homogeneous 60 gft$^{-3}$ precious metal content (57Pd:3Rh) at 3 gin$^{-3}$ homogeneous washcoat loading on a 600 cells per square inch cordierite monolith substrate having the same dimensions as the third and fourth filters) are identical. However, the hydrocarbon light-off is higher for the Homogenous PGM configuration relative to the Zoned configuration. This can be attributed to the higher concentration of PGM on the inlet side.

TABLE 2

Effect of PGM zoning on light-off temperature

| Sample filter properties | PGM zoning | HC light-off temperature (° C.) | % PN reduction vs. flow through reference | Peak BP (mbar) during any one MVEG-B drive cycle |
|---|---|---|---|---|
| 20 μm, 65% | Homogeneous | 391 | 73 | 37.5 |
| 20 μm, 65% | Zoned | 379 | 73 | 35.8 |

For the avoidance of any doubt, the entire contents of all prior art documents cited herein is incorporated herein by reference.

I claim:

1. A catalysed filter for filtering particulate matter from exhaust gas emitted from a positive ignition internal combustion engine, which filter comprising a porous substrate having a total substrate length and having inlet surfaces and outlet surfaces, wherein the inlet surfaces are separated from the outlet surfaces by a porous structure containing pores of a first mean pore size, wherein the porous substrate is coated with a three-way catalyst washcoat comprising a plurality of solid particles and at least one precious metal, wherein the porous structure of the washcoated porous substrate contains pores of a second mean pore size, wherein the second mean pore size is less than the first mean pore size, which three-way catalyst washcoat being axially arranged on the porous substrate between a first zone comprising the inlet surfaces of a first substrate length less than the total substrate length and a second zone comprising the outlet surfaces of a second substrate length less than the total substrate length, wherein the sum of the substrate length in the first zone and the substrate length in the second zone ≥100% and wherein:

(i) a washcoat loading in the first zone >second zone;
(ii) a total precious metal loading in the first zone >second zone; or
(iii) both a washcoat loading and a total precious metal loading in the first zone >second zone.

2. A catalysed filter according to claim 1, wherein the washcoat loading in the first zone is >1.60 g in$^{-3}$.

3. A catalysed filter according to claim 1, wherein a substrate length in the first zone is different from that of the second zone.

4. A catalysed filter according to claim 3, wherein the substrate length in the first zone is <the substrate length in the second zone.

5. A catalysed filter according to claim 4, wherein the substrate zone length in the first zone is <45% of the total substrate length.

6. A catalysed filter according to claim 1, wherein (ii) the total precious metal loading in the first zone is greater than in the second zone or (iii) both the washcoat loading and the total precious metal loading in the first zone are greater than in the second zone, and the total precious metal loading in the first zone is greater than 50 gft$^{-3}$.

7. A catalysed filter according to claim 1, comprising a surface washcoat, wherein a washcoat layer substantially covers surface pores of the porous structure and the pores of the washcoated porous substrate are defined in part by spaces between the particles in the washcoat.

8. A catalysed filter according to claim 7, wherein a D90 of solid washcoat particles is in the range 0.1 to 20 μm.

9. A catalysed filter according to claim 1, wherein the mean size of the solid washcoat particles is in the range 1 to 40 μm.

10. A catalysed filter according to claim 1, wherein the porous substrate is a wall-flow filter.

11. A catalysed filter according to claim 1, wherein the uncoated porous substrate has a porosity of >40%.

12. A catalysed filter according to claim 1, wherein a first mean pore size of the porous structure of the porous substrate is from 8 to 45 μm.

13. An exhaust system for a positive ignition internal combustion engine comprising a catalysed filter according to claim 1, wherein the first zone is disposed upstream of the second zone.

14. An exhaust system according to claim 13, comprising a flow through monolith substrate comprising a three-way catalyst composition disposed upstream of the catalysed filter.

15. A positive ignition engine comprising an exhaust system according to claim 13.

16. A method of simultaneously converting carbon monoxide, hydrocarbons, oxides of nitrogen and particulate matter in the exhaust gas of a positive ignition internal combustion engine, which method comprising the step of contacting the gas with a catalysed filter according to claim 1.

* * * * *